(12) United States Patent
Kim et al.

(10) Patent No.: US 8,483,700 B2
(45) Date of Patent: Jul. 9, 2013

(54) CHANNEL ALLOCATION DEVICE AND METHOD USING WIRELESS ACCESS IN VEHICULAR ENVIRONMENTS

(75) Inventors: Min Jung Kim, Daejeon (KR); Sangwoo Lee, Daejeon (KR); Jong Min Park, Daejeon (KR); Kyeong-Soo Han, Daejeon (KR); Hyun Kyun Choi, Daejeon (KR); Hyun Seo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 12/984,837

(22) Filed: Jan. 5, 2011

(65) Prior Publication Data

US 2011/0306353 A1  Dec. 15, 2011

(30) Foreign Application Priority Data

Jun. 11, 2010 (KR) ........................ 10-2010-0055494

(51) Int. Cl.
*H04W 72/00* (2009.01)
(52) U.S. Cl.
USPC .................. 455/452.1; 455/435.1; 455/435.2; 455/450; 455/452.2
(58) Field of Classification Search
USPC .......................... 455/435.1, 435.2, 450–452.2
See application file for complete search history.

(56) References Cited

U.S. PATENT DOCUMENTS

| 2003/0129952 A1* | 7/2003 | Inoue ............................... 455/95 |
| 2005/0136855 A1* | 6/2005 | Ogawa ............................. 455/99 |
| 2010/0003985 A1 | 1/2010 | Jang et al. |
| 2011/0201373 A1* | 8/2011 | Suzuki et al. ................. 455/517 |

FOREIGN PATENT DOCUMENTS

KR  10-2010-0003709  1/2010

OTHER PUBLICATIONS

Tseng et al., "Location-based Fast Handoff for 802.11 Networks", IEEE Communication Letters, vol. 9, No. 4, Apr. 2005, pp. 304-306.
Choi et al., "A Solicitation-based IEEE 802.11p MAC Protocol for Roadside to Vehicular Networks", IEEE 2007 Mobile Networking for Vehicular Environments, vol. 11, No. 11, May 2007, pp. 91-95.
Roberto A. Uzcátegui et al., "WAVE: A Tutorial", IEEE Communications Magazine, May 2009, pp. 126-133.
Shiann-Tsong Sheu et al., "A Channel Access Scheme to Compromise Throughput and Fairness in IEEE 802.11p Multi-Rate/Multi-channel Wireless Vehicular Networks", IEEE Vehicular Technology Conference Proceedings, May 2010, 5 pp.

\* cited by examiner

*Primary Examiner* — Melody Mehrpour
*Assistant Examiner* — Jaime Holliday
(74) *Attorney, Agent, or Firm* — Staas & Halsey LLP (57) ABSTRACT

A device for allocating a channel by using wireless access in a vehicular environment in which an onboard unit is provided in a vehicle and at least one roadside unit is provided, receives a service announcement message from at least one roadside unit, uses the service announcement message to generate an available service table, determines whether the available service table has roadside unit entries for transmitting the service announcement message, and if so, compares average RSSI provided by the roadside units to select a roadside unit to access, selects a channel that corresponds to the service provider ID with the highest priority from among the service provided by the selected roadside unit, and assigns the selected channel as a service channel to exchange information with the roadside unit.

12 Claims, 6 Drawing Sheets

| index | PSID | SvcPriority | WSAType | src_mac | gw_mac | Status | Ch_Num | Aging | RSSI | A_RSSI |
|---|---|---|---|---|---|---|---|---|---|---|
| 0 | 256 | 3 | 0 | 11 22 33 44 55 66 | 00 22 90 60 5D 80 | 1 | 2 | 0 | 81 | 58 |
| 1 | 257 | 3 | 0 | 11 22 33 44 55 66 | 00 22 90 60 5D 80 | 1 | 2 | 0 | 81 | 58 |
| 2 | 512 | 4 | 0 | 11 22 33 44 55 66 | 00 22 90 60 5D 80 | 1 | 2 | 0 | 81 | 58 |
| 3 | 256 | 3 | 0 | 66 55 44 33 22 11 | 00 22 90 60 5D 80 | 1 | 3 | 0 | 74 | 26 |
| 4 | 257 | 3 | 0 | 66 55 44 33 22 11 | 00 22 90 60 5D 80 | 1 | 3 | 0 | 74 | 26 |
| 5 | 512 | 4 | 0 | 66 55 44 33 22 11 | 00 22 90 60 5D 80 | 1 | 3 | 0 | 74 | 26 |

RSU0 (rows 0–2), RSU1 (rows 3–5)

FIG. 6

CHANNEL ALLOCATION DEVICE AND METHOD USING WIRELESS ACCESS IN VEHICULAR ENVIRONMENTS

CROSS-REFERENCE TO RELATED APPLICATION

This application claims priority to and the benefit of Korean Patent Application No. 10-2010-0055494 filed in the Korean Intellectual Property Office on Jun. 11, 2010, the entire contents of which are incorporated herein by reference.

BACKGROUND OF THE INVENTION (a) Field of the Invention

The present invention relates to a channel allocation method and device using wireless access in a vehicular environment. Particularly, the present invention relates to a channel allocation method and device for handover by a base station in communication between the base station and a vehicle using wireless access in the vehicular environment.

(b) Description of the Related Art

The wireless access in vehicular environments (WAVE) method supports communication of fast running vehicles, and is configured with the Institute of Electrical and Electronics Engineers (IEEE) 802.11p and the IEEE 1609. In this instance, the IEEE 1609.3 of the IEEE 1609 defines a network layer and a transport layer service, and the IEEE 1609.4 provides a multichannel operation.

A WAVE-applied traffic system can provide a seamless service to the vehicle in vehicle to vehicle (V2V) communication and vehicle to infrastructure (V2I) communication.

The WAVE uses a control channel (CCH) and a plurality of service channels (SCH). In detail, a service provider notifies service provision by using a WAVE service announcement (WSA) message periodically transmitted by a control channel, and a user periodically monitors the control channel to access a plurality of service channels.

For example, at least one onboard unit (OBU) provided in the vehicle traveling on the roadway analyzes the WSA message, assigns a channel with a high service priority based on the analysis result, and uses the assigned channel to receive the service seamlessly.

However, when the onboard unit receives the WSA message from two roadside units (RSU) while the roadside units are installed on both sides of the road, the method for performing a handover from the communicating roadside unit to another roadside unit cannot provide a seamless service.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a channel allocation method and device for an onboard unit to perform a handover from a communicating roadside unit to another roadside unit in a vehicular communication environment.

An exemplary embodiment of the present invention provides a method for allocating a channel by using wireless access in a vehicular environment in which an onboard unit is provided in a vehicle and at least one roadside unit is provided, including: the onboard unit receiving a service announcement message from the at least one roadside unit; generating an available service table by using the service announcement message; determining whether the available service table includes the plurality of roadside unit entries for transmitting the service announcement message; when the available service table includes the plurality of roadside unit entries, selecting a roadside unit to access by comparing average received signal strength indication (RSSI) transmitted by the roadside units; selecting a channel that corresponds to a service provider ID with the highest priority from among the services provided by the selected roadside unit; and allocating the selected channel as a service channel and exchanging information with the roadside unit based on the service channel.

Another embodiment of the present invention provides a method for allocating a channel by using wireless access in a vehicular environment in which an onboard unit is provided in a vehicle and a first roadside unit and a second roadside unit are provided, including: the first roadside unit transmitting a first service announcement message to the onboard unit on a reference channel assigned as a control channel; the second roadside unit transmitting a second service announcement message to the onboard unit on the reference channel; the onboard unit allocating a service channel based on the first service announcement message and the second service announcement message; and the onboard unit exchanging information with the corresponding roadside unit based on the assigned service channel.

Yet another embodiment of the present invention provides a device for allocating a channel by using wireless access in a vehicular environment in which an onboard unit is provided in a vehicle and at least one roadside unit is provided, including: a message receiver for receiving a service announcement message from the at least one roadside unit; a message processor for generating an available service table by using the service announcement message; a channel processor for, when there are a plurality of roadside unit entries for transmitting the service announcement message, selecting a roadside unit to access by comparing average RSSI transmitted by roadside units, and selecting a channel that corresponds to a service provider ID with the highest priority from among the service provided by the selected roadside unit; and a controller for allocating the selected channel as a service channel, and exchanging information with the roadside unit based on the service channel.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

Hereinafter, a channel allocation method and device using the wireless access in vehicular environments (WAVE) according to an exemplary embodiment of the present invention will be described with reference to the accompanying drawings.

Figure 1:
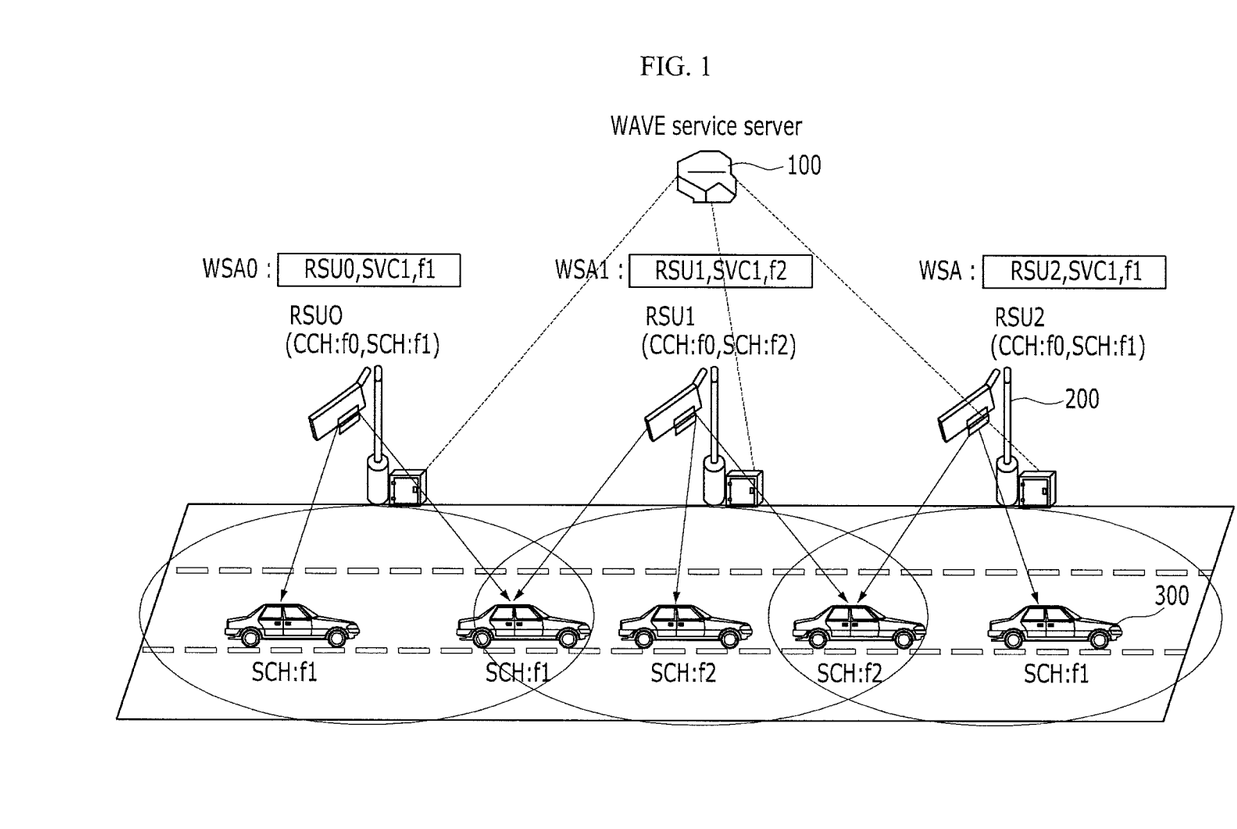
FIG. 1 shows a WAVE-based communication environment according to an exemplary embodiment of the present invention.

FIG. 1 shows a WAVE-based communication environment according to an exemplary embodiment of the present invention.

The communication environment according to an exemplary embodiment of the present invention represents a vehicle to infrastructure (V2I) communication environment based on the WAVE communication method.

The communication environment according to an exemplary embodiment of the present invention includes a WAVE service server 100, at least one roadside unit (RSU0-RSU2) 200, and at least one onboard unit (OBU) 300. Here, at least one RSU 200 is installed on the roadside at regular intervals. Also, at least one OBU 300 can be provided inside or outside the vehicle, and it communicates with the RSU 200 or another OBU.

The at least one RSU 200 periodically transmits a WAVE service announcement (WSA) message to the control channel (CCH). Here, the WAS message includes a corresponding RSU, a service provided by the RSU, and a service channel (SCH) number through which the service is provided.

For example, when one RSU and an adjacent RSU use the same service channel for the same service, the communication is disconnected by interference in the section where the service area is overlapped. Also, it is impossible to perform a continuous handover in this section. The adjacent RSU's transmit the WSA message by using different channels for the same service.

As shown in FIG. 1, the first RSU (RSU0) provides a switched virtual channel (SVC) at a first channel f1, and the second RSU (RSU1) adjacent to the first RSU (RSU0) provides an SVC corresponding to the same service at a second channel f2. A third RSU (RSU2) adjacent to the second RSU (RSU1) provides an SVC corresponding to the service at the first channel f1. Also, each RSU generates corresponding WSA messages (WSA0, WSA1, WSA) at a reference channel f0 assigned as a control channel (CCH).

In the above-noted communication environment, the OBU 300 of the vehicle receiving the service that corresponds to the SVC receives the service through the first channel f1 in the first communication area of the first RSU (RSU0), and receives the service through the first channel f1 or the second channel f2 in the overlapped area of the first communication area of the first RSU (RSU0) and the second communication area of the second RSU (RSU1). The OBU 300 of the vehicle receives the service through the second channel f2 in the second communication area of the second RSU RSU1 to consecutively perform the handover.

Particularly, the channel allocation method in the overlapped area of the first communication area of the first RSU (RSU0) and the second communication area of the second RSU (RSU1) is to assign a channel in order for the OBU 300 of the vehicle to receive the service through the second channel f2 on the first channel f1 based on the received signal strength indication (RSSI).

A method for processing a WSA message between at least one RSU 200 and an OBU 300 will now be described with reference to FIG. 2.

Figure 2:
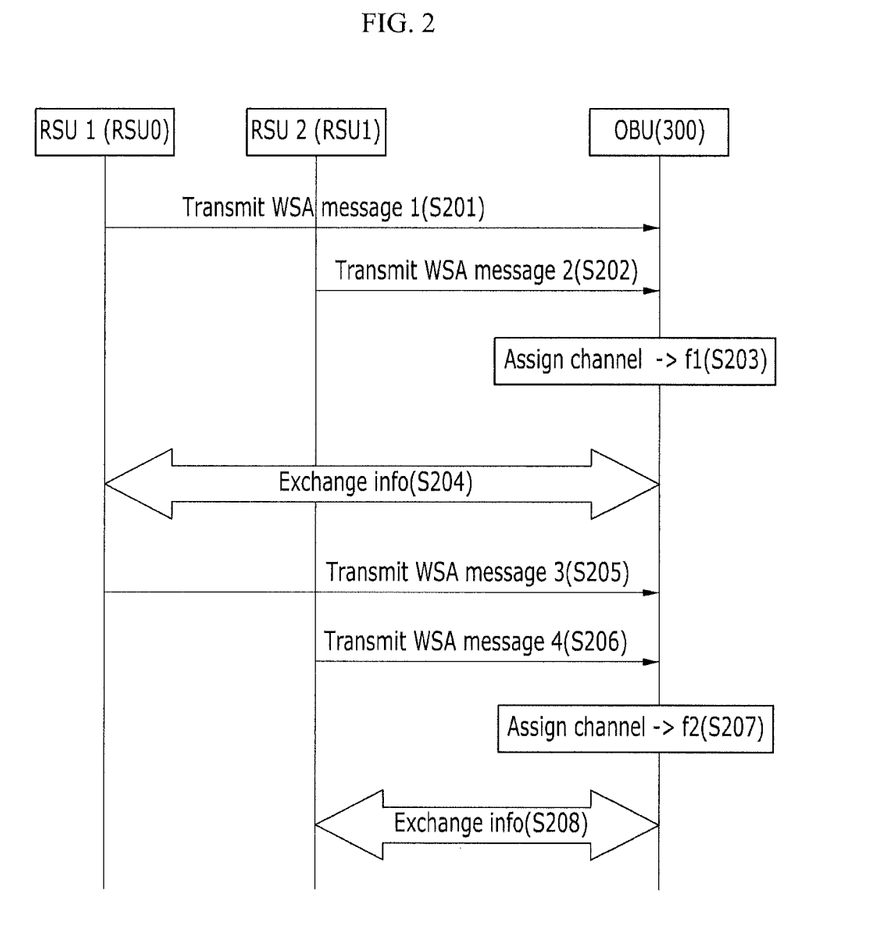
FIG. 2 shows a message process flowchart between at least one RSU and an OBU according to an exemplary embodiment of the present invention.

FIG. 2 shows a message process flowchart between at least one RSU and an OBU according to an exemplary embodiment of the present invention.

As shown in FIG. 2, the first RSU (RSU0) generates a first WSA message on the reference channel f0 assigned as the control channel, and transmits the first WSA message to the OBU 300 (S201). The second RSU (RSU1) generates a second WSA message on the reference channel f0 assigned as the control channel, and transmits the second WSA message to the OBU 300 (S202). In this instance, the first WSA message and the second WSA message respectively include a service provided by the corresponding RSU (RSU0 or RSU1) and a service channel (SCH) number for providing the service.

Based on the WSA message, the OBU 300 assigns the service channel (SCH) as the first channel f1 (S203), and exchanges information with the first RSU (RSU0) through the assigned first channel f1 (S204).

Also, the second RSU (RSU1) generates a third WSA message on the reference channel f0 assigned as a control channel, and transmits the third WSA message to the OBU 300 (S205). The second RSU (RSU1) generates a fourth WSA message on the reference channel f0 assigned as a control channel, and transmits the fourth WSA message to the OBU 300 (S206).

Based on the WSA message, the OBU 300 assigns the service channel (SCH) as the second channel f2 (S207), and exchanges information with the second RSU (RSU1) through the assigned second channel f2 (S208).

Therefore, the at least one RSU 200 generates a WSA message on the reference channel f0, and broadcasts the WSA message. Also, based on the received WSA message, the OBU 300 assigns a service channel and exchanges information through the assigned service channel.

The OBU 300 in the channel allocation device using the WAVE will now be described in detail with reference to FIG. 3.

Figure 3:
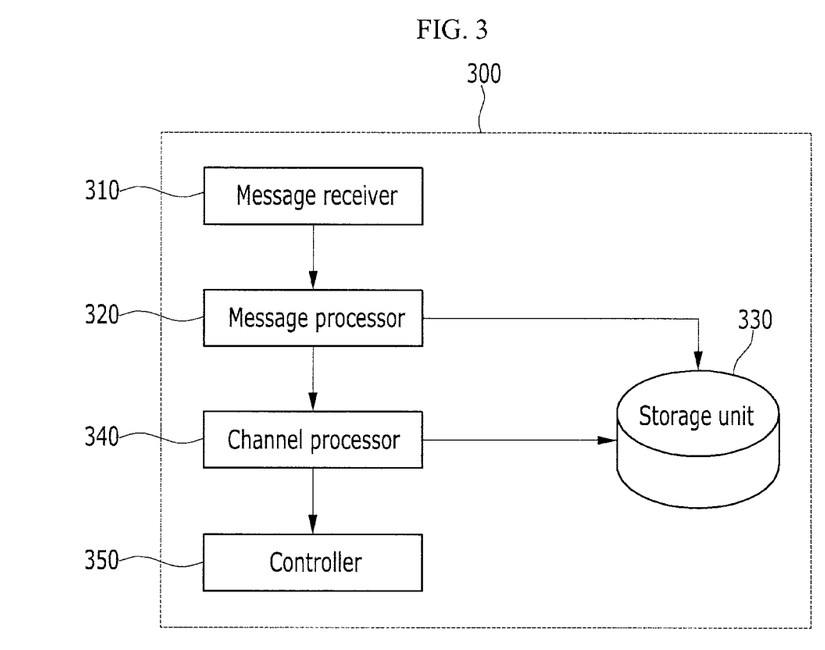
FIG. 3 shows a block diagram of a configuration of an onboard unit for receiving a WSA message according to an exemplary embodiment of the present invention.

FIG. 3 shows a block diagram of a configuration of an onboard unit for receiving a WSA message according to an exemplary embodiment of the present invention.

As shown in FIG. 3, the OBU 300 includes a message receiver 310, a message processor 320, a storage unit 330, a channel processor 340, and a controller 350.

The message receiver 310 receives a WSA message from at least one RSU 200.

The message processor 320 extracts information on respective services provided by the corresponding RSU from the received WSA message, and generates an available service table based on the extracted information. Here, the available service table includes information on the service provided by at least one RSU 200, for example, a provider service ID (PSID), a priority, and a service channel number. The message processor 320 stores the available service table in the storage unit 330.

The channel processor 340 checks the service that corresponds to the service registered by the user from the available service table, and selects the service channel (SCH) in consideration of the priority of the service.

The controller 350 transmits/receives information to/from the corresponding RSU 200 through the service channel selected by the channel processor 340.

A channel allocation method using the WAVE will now be described with reference to FIG. 4.

Figure 4:
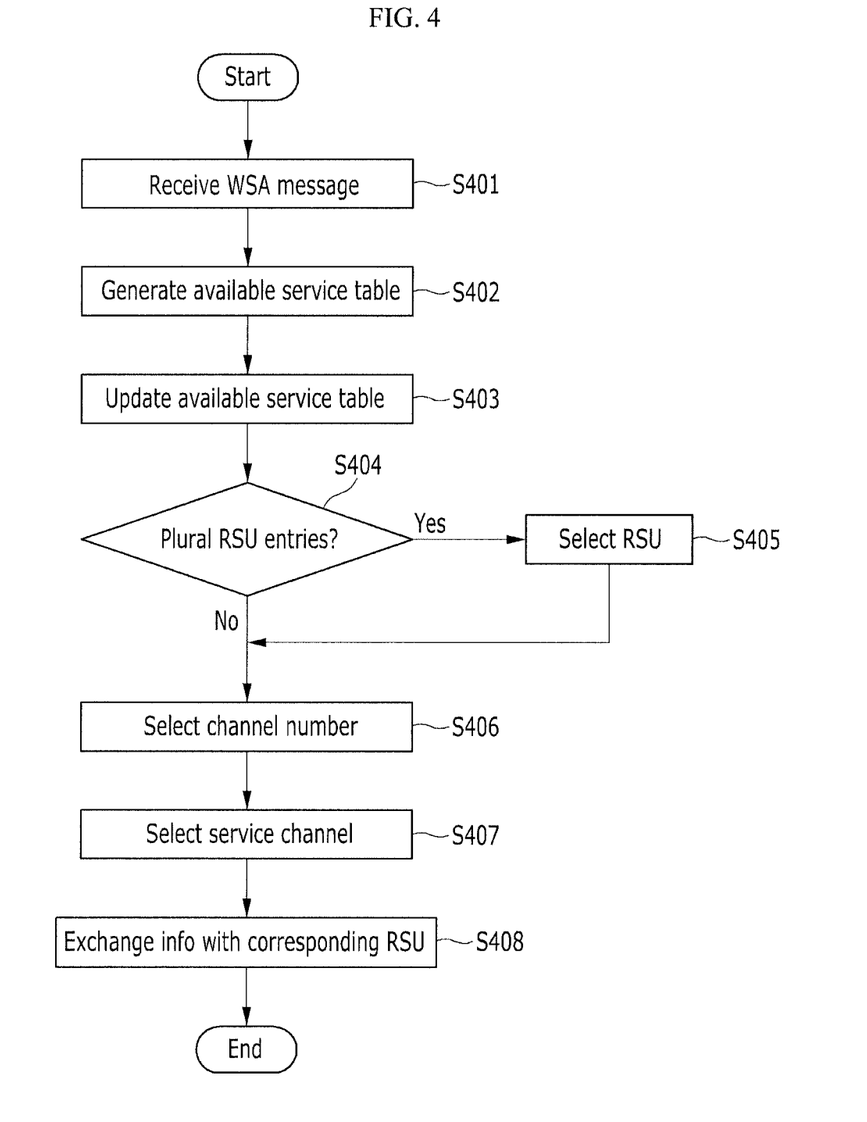
FIG. 4 shows a flowchart of a channel allocation method using the WAVE according to an exemplary embodiment of the present invention.
Figure 5:
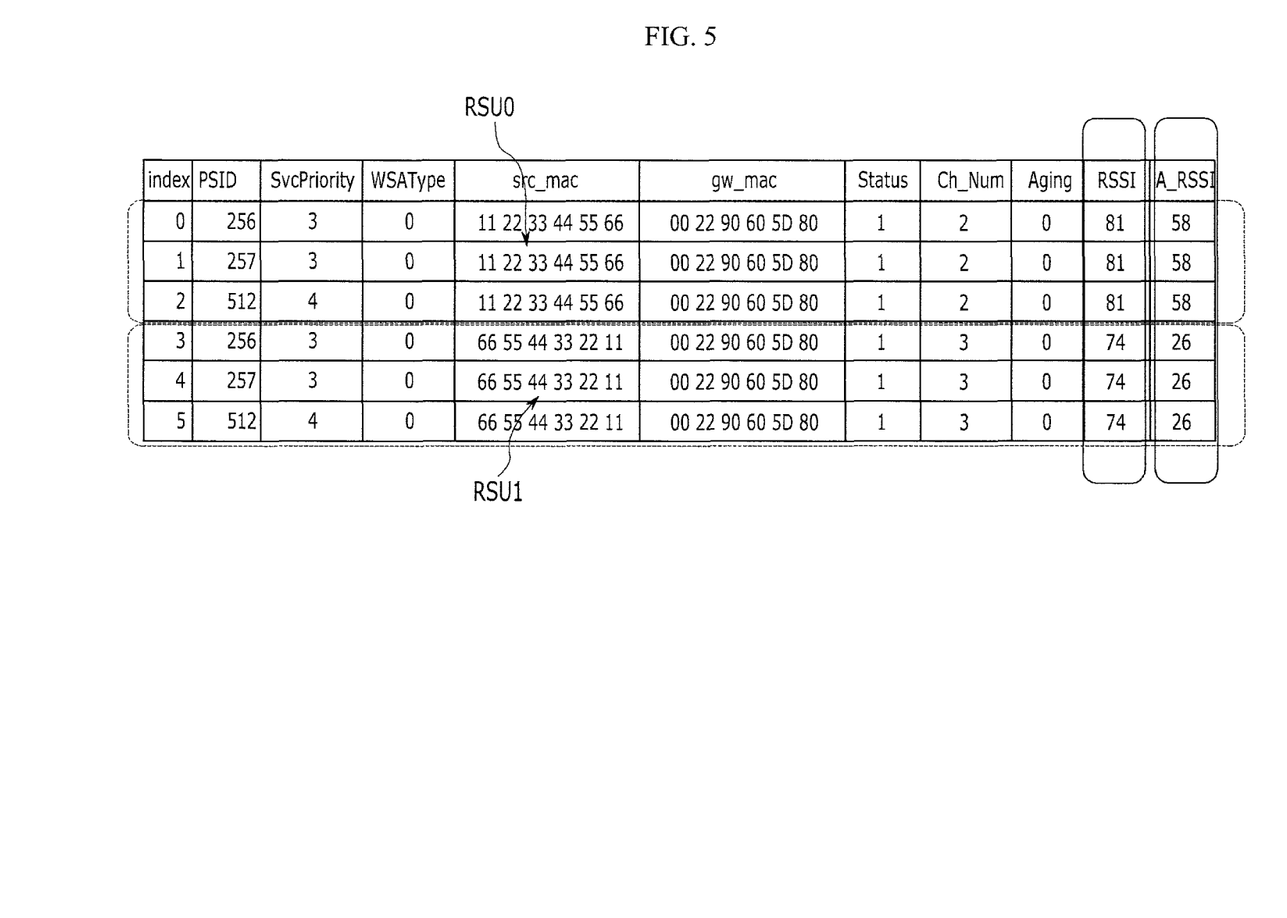
FIG. 5 shows an available service table according to an exemplary embodiment of the present invention.

FIG. 4 shows a flowchart of a channel allocation method using the WAVE according to an exemplary embodiment of the present invention, and FIG. 5 shows an available service table according to an exemplary embodiment of the present invention.

The communication environment according to an exemplary embodiment of the present invention includes at least one RSU 200 and an OBU 300, and the at least one RSU 200 transmits a WSA message to the OBU 300 through the control channel (CCH).

As shown in FIG. 4, the OBU 300 receives a WSA message from at least one RSU 200 (S401). The OBU 300 uses the WSA message to generate an available service table (S402). The available service table in this instance us expressed in FIG. 5.

In detail, the OBU 300 extracts information on the respective services provided by the corresponding RSU from the WSA message. The OBU 300 generates an available service table based on the extracted information. In this instance, the available service table includes information on the services provided by at least one RSU 200, such as a PSID, priority, and a service channel number. Also, the OBU 300 includes an aging function for deleting corresponding information from the available service table when the WSA message is not received from a predetermined period.

When receiving the WSA messages from a plurality of RSU's, the OBU 300 calculates the received signal strength indication (RSSI) and the average RSSI (avg_RSSI) and records them. The OBU 300 selects the RSU to access by using the calculated RSSI and the average RSSI.

The OBU 300 updates the available service table with the service that corresponds to the PSID based on the user service information (S403).

The OBU 300 determines whether the updated available service table has a plurality of RSU's entries for providing the WSA message (S404).

When the updated available service table has a plurality of RSU's, the OBU 300 compares corresponding average RSSI of the respective RSU's to select the RSU to access (S405). As shown in FIG. 5, two RSU entries generated by the OBU 300 based on the WSA message from the first RSU (RSU0) and the second RSU (RSU1) in the available service table.

The OBU 300 compares the average RSSI (58) of the first RSU (RSU0) and the average RSSI (26) of the second RSU (RSU1) to select the first RSU (RSU0). The OBU 300 compares the average RSSI in order to prevent the access to the RSU from being frequently changed in the environment where the RSSI values are substantially changed. The OBU 300 can then minimize the delay time required to access the RSU through a link.

When the RSU to access is selected, the OBU 300 searches the PSID with the highest priority from among the service provided by the selected RSU, and selects a channel number corresponding to the searched PSID (S406). As shown in FIG. 5, the OBU 300 accesses the selected first RSU (RSU0), and selects the channel number "2" corresponding to the PSID having the greatest priority (512) from among the service provided by the first RSU (RSU0).

The OBU 300 assigns the selected channel as a service channel (SCH) (S407), and exchanges information with the corresponding RSU (S408).

Accordingly, the channel allocation method according to an exemplary embodiment of the present invention controls the OBU to assign the service channel and access the corresponding RSU. Further, the channel allocation method assigns the service channel based on the RSSI to allow continuous access to another RSU when the OBU changes the access to the other RSU.

An equation and algorithm for calculating the RSSI and average RSSI according to an exemplary embodiment of the present invention are expressed in Equation 1, but the present invention is not restricted thereto.

$$\text{avg\_RSSI}_{new}(RSU_n) = \text{avg\_RSSI}_{old}(RSU_n) \times (1 - Wc) + \text{current\_RSSI}(RSU_n) \times Wc$$

$$\text{avg\_RSSI}_{new}(RSU_{n+1}) = \text{avg\_RSSI}_{old}(RSU_{n+1}) \times (1 - Wc) + \text{current\_RSSI}(RSU_{n+1}) \times Wc \quad \text{(Equation 1)}$$

If $(\text{avg\_RSSI}_{new}(RSU_n) < \text{avg\_RSSI}_{new}(RSU_{n+1}))$ then Handover $(RSU_{n+1})$ Else stay $(RSU_n)$ Wc represents the weight of current_RSSI $(1 < Wc <= 1)$ Since the RSSI value changes abruptly when the vehicle runs fast, frequent changes of the access to the RSU when the RSSI of the currently accessed RSU is steeply reduced or when the signal of the next RSU is strongly received can be prevented when the algorithm expressed in Table 1 according to an exemplary embodiment of the present invention is used.

A handover process corresponding to the RSSI and average RSSI will now be described with reference to FIG. 6.

Figure 6:
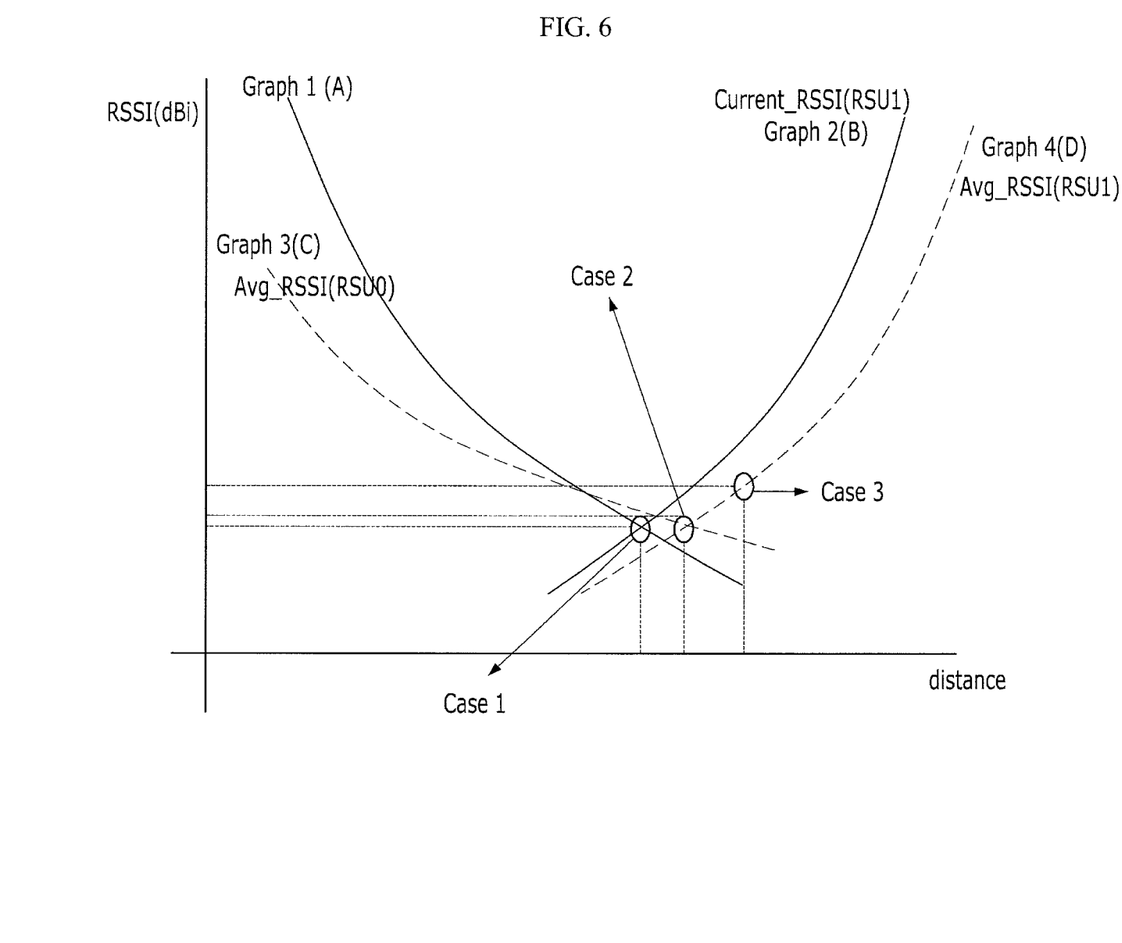
FIG. 6 shows a graph of a handover process according to an exemplary embodiment of the present invention.

FIG. 6 shows a graph of a handover process according to an exemplary embodiment of the present invention.

The horizontal axis of the graph represents the distance between the OBU 300 and the corresponding RSU, and the vertical axis represents the RSSI (dBi).

As shown in FIG. 6, the first graph (A) indicates the RSSI of the first RSU (RSU0), and the second graph (B) shows the RSSI of the second RSU (RSU1). Also, the third graph (C) shows the average RSSI (avg_RSSI (RSU0)) of the first RSU (RSU0), and the fourth graph (D) indicates the average RSSI (avg_RSSI (RSU1)) of the second RSU (RSU1).

When the RSSI of the first RSU (RSU0) is equal to the RSSI of the second RSU (RSU1) or the average RSSI of the first RSU (RSU0) is greater than the average RSSI of the second RSU (RSU1), the OBU 300 assigns the service channel (SCH) as the first channel f1 based on the first WSA message. In this instance, the first WSA message is generated from the reference channel f0 assigned as a control channel by the first RSU RSU0. The OBU 300 exchanges information with the first RSU (RSU0) through the first channel f1.

Also, when the RSSI of the first RSU (RSU0) is greater than the RSSI of the second RSU (RSU1) or the average RSSI of the first RSU (RSU0) is equal to the average RSSI of the second RSU (RSU1), the OBU 300 exchanges information with the first RSU (RSU0).

However, when the RSSI of the first RSU (RSU0) is less than the RSSI of the second RSU (RSU1) or the average RSSI of the first RSU (RSU0) is less than the average RSSI of the second RSU (RSU1), the OBU 300 selects the second RSU RSU1 based on the RSSI or the average RSSI.

The OBU 300 accesses the second RSU (RSU1), and performs a handover of the second RSU (RSU1) at the first RSU (RSU0). The OBU 300 exchanges information with the second RSU (RSU1) through the second channel f2.

According to an embodiment of the present invention, the channel allocation method and device using the wireless access in the vehicular environment assigns the service channel based on the received signal strength and thereby provides the seamless service when the onboard unit performs a handover from the communicating roadside unit to another roadside unit.

Also, according to an exemplary embodiment of the present invention, the channel allocation method and device can minimize the delay time generated during access by preventing frequent changes of access to the roadside unit in an environment with substantial changes of received signal strength.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating a channel by using wireless access in a vehicular environment in which an onboard unit is provided in a vehicle and at least one roadside unit is provided, comprising:
   the onboard unit receiving a service announcement message from the at least one roadside unit;
   generating an available service table by using the service announcement message;
   determining whether the available service table includes a plurality of roadside unit entries for transmitting the service announcement message;
   when the available service table includes a plurality of roadside unit entries, selecting a roadside unit to access by comparing average received signal strength indication (RSSI) for the roadside units included in the available service table;
   selecting a channel that corresponds to a service provider ID with the highest priority from among the services provided by the selected roadside unit; and
   allocating the selected channel as a service channel, and exchanging information with the roadside unit based on the service channel,
   wherein the generating of the available service table further includes updating the available service table with the service that corresponds to the service provider ID based on information on the service desired by the user of the onboard unit.

2. The method of claim 1, wherein the generating of the available service table includes: extracting information on the services provided by the corresponding roadside unit from the service announcement message; and generating the available service table based on extracted information.

3. The method of claim 2, wherein the available service table includes at least one of a service provider ID provided by each roadside unit, a service priority, and a service channel number.

4. The method of claim 1, wherein, when the available service table includes one roadside unit entry, the method further includes:
   selecting a channel that corresponds to a service provider ID with the highest priority from among the service provided by one roadside unit; and
   allocating the selecting channel as a service channel, and exchanging information with the roadside unit through the service channel.

5. A method for allocating a channel by using wireless access in a vehicular environment in which an onboard unit is provided in a vehicle, and a first roadside unit and a second roadside unit are provided, comprising:
   the first roadside unit transmitting a first service announcement message to the onboard unit on a reference channel assigned as a control channel;
   the second roadside unit transmitting a second service announcement message to the onboard unit on the reference channel;
   the onboard unit allocating a service channel based on the first service announcement message and the second service announcement message, based on comparing average RSSI of the first roadside unit and the second roadside unit; and
   the onboard unit exchanging information with the corresponding roadside unit based on the assigned service channel,
   wherein an available service table is generated, the generating including updating the available service table with the service that corresponds to the service provider ID based on information on the service desired by the user of the onboard unit.

6. The method of claim 5, wherein the first service announcement message and the second service announcement message respectively include a service provided by the corresponding roadside unit and a number of a service channel for providing the service.

7. The method of claim 6, wherein the allocating of a service channel includes:
   selecting a roadside unit to access based on the comparison result;
   selecting a channel number that corresponds to the service provider ID with the highest priority from among the service provided by the selected roadside unit; and
   allocating a channel that corresponds to the selected channel number as the service channel.

8. A device for allocating a channel by using wireless access in a vehicular environment in which an onboard unit is provided in a vehicle and at least one roadside unit is provided, comprising:
   a message receiver for receiving a service announcement message from the at least one roadside unit;
   a message processor for generating an available service table by using the service announcement message;
   a channel processor for, when there are a plurality of roadside unit entries for transmitting the service announcement message in the available service table, selecting a roadside unit to access by comparing average RSSI for the roadside units included in the available service table, and selecting a channel that corresponds to a service provider ID with the highest priority from among the service provided by the selected roadside unit; and a controller for allocating the selected channel as a service channel, and exchanging information with the roadside unit based on the service channel, wherein the message processor updates the available service table with the service that corresponds to the service provider ID based on information on the service desired by a user of the onboard unit.

9. The device of claim 8, wherein the message processor extracts information on the services provided by the corresponding roadside unit from the service announcement message and generates the available service table based on the extracted information.

10. The device of claim 9, wherein the available service table includes information provided by the roadside units.

11. The device of claim 10, wherein the information provided by the roadside units includes at least one of a service provider ID, a service priority, and a service channel number.

12. The device of claim 8, wherein when there is one roadside unit entry for transmitting the service announcement message, the channel processor selects a channel that corresponds to a service provider ID with the highest priority from among the service provided by one roadside unit, assigns the selected channel as a service channel, and exchanges information with the one roadside unit through the service channel.

* * * * *